(12) United States Patent
Lee et al.

(10) Patent No.: US 10,178,418 B2
(45) Date of Patent: Jan. 8, 2019

(54) METHOD AND SYSTEM FOR PROCESSING MPEG DATA

(71) Applicant: Electronics and Telecommunications Research Institute, Daejeon (KR)

(72) Inventors: Jin Young Lee, Daejeon (KR); Kug Jin Yun, Daejeon (KR); Won Sik Cheong, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/859,006

(22) Filed: Dec. 29, 2017

(65) Prior Publication Data

US 2018/0124441 A1    May 3, 2018

Related U.S. Application Data

(63) Continuation of application No. 14/414,351, filed as application No. PCT/KR2013/006174 on Jul. 11, 2013, now Pat. No. 9,936,232.

(60) Provisional application No. 61/711,453, filed on Oct. 9, 2012, provisional application No. 61/670,354, filed on Jul. 11, 2012.

(30) Foreign Application Priority Data

Jul. 10, 2013  (KR) ......................... 10-2013-0080839

(51) Int. Cl.
*H04N 7/12* (2006.01)
*H04N 11/02* (2006.01)
*H04N 11/04* (2006.01)
*H04N 21/236* (2011.01)
*H04N 21/434* (2011.01)
*H04N 21/845* (2011.01)

(52) U.S. Cl.
CPC ... *H04N 21/23614* (2013.01); *H04N 21/4348* (2013.01); *H04N 21/8456* (2013.01)

(58) Field of Classification Search
None
See application file for complete search history.

(56) References Cited

U.S. PATENT DOCUMENTS 6,172,990 B1    1/2001   Deb et al.
7,787,496 B1    8/2010   Singh et al.
9,705,935 B2    7/2017   Sundarraman et al.
(Continued)

FOREIGN PATENT DOCUMENTS

KR    1020010089626 A    10/2001
KR    10200670121482 A   12/2007
(Continued)

*Primary Examiner* — Talha M Nawaz
(74) *Attorney, Agent, or Firm* — William Park & Associates Ltd.

(57) ABSTRACT

Provided is a method of processing MPEG data, the method including: obtaining at least one access unit including media data coded through processing including an encapsulation and a packetization; generating at least one media processing unit (MPU) by grouping at least one access unit; determining a duration flag indicating whether duration information of the at least one access unit is valid, in a corresponding MPU; and inserting the duration flag into a header of the corresponding MPU.

7 Claims, 9 Drawing Sheets

(56) References Cited

U.S. PATENT DOCUMENTS

| | | |
|---|---|---|
| 2006/0112272 A1 | 5/2006 | Morioka et al. |
| 2008/0040498 A1 | 2/2008 | Setlur et al. |
| 2010/0223533 A1* | 9/2010 | Stockhammer ..... H03M 13/373 714/776 |
| 2011/0088076 A1 | 4/2011 | Li et al. |
| 2012/0147141 A1 | 6/2012 | Sasaki et al. |
| 2016/0119455 A1 | 4/2016 | Stacey |

FOREIGN PATENT DOCUMENTS

| | | |
|---|---|---|
| KR | 100809298 B1 | 3/2008 |
| KR | 1020080114500 A | 12/2008 |
| KR | 1020100067129 A | 6/2010 |
| KR | 1020120084275 A | 7/2012 |

* cited by examiner timed media data processing 110 non-timed media data processing 120

FIG. 4

| Syntax | No. Of bits | Mnemonic |
|---|---|---|
| MPU_Header(){<br>  mpu_length;<br>  header_length;<br>  mpu_sequence_number;<br>  number_of_au;<br>  duration_flag; ~410<br>  if ( duration_flag ) {<br>    default_duration_flag; ~420<br>    if ( default_duration_flag )<br>      default_duration; ~430<br>  }<br>  for(int i=0; i<number_of_au; i++){<br>    au_length;<br>    if (duration_flag==1 & default_duration_flag==0 )<br>      duration; ~440<br>  }<br>  private_header_flag;<br>  if(private_header_flag == 1){<br>    private_header_length<br>    private_header<br>  }<br>}<br>MPU_Payload() | 1<br><br><br><br><br><br>1<br><br>TBD<br><br><br><br><br>TBD | |

FIG. 6

| Syntax | No. Of bits | Mnemonic |
|---|---|---|
| MPU_Header(){<br>  mfu_length;<br>  header_length;<br>  start_flag; ~610<br>  priority_present_flag; ~620<br>  sending_order_present_flag; ~630<br>  if (priority_present_flag)<br>    priority; ~640<br>    ~~dependency_counter;~~ ~650<br>  if (sending_order_present_flag)<br>    sending_order; ~660<br>}<br>MFU_Payload() | <br><br><br><br>1<br>1<br><br><br>TBD<br><br><br>TBD | |

METHOD AND SYSTEM FOR PROCESSING MPEG DATA

CROSS-REFERENCE TO RELATED APPLICATIONS

The present application is a Continuation of U.S. application Ser. No. 14/414,351, filed on Jan. 12, 2015, which is a national stage of PCT/KR2013/006174 filed on Jul. 11, 2013, which claims priority to Korean application number 10-2013-0080839, filed on Jul. 10, 2013, in the Korean Intellectual Property Office. PCT/KR2013/006174 claims priority to U.S. provisional patent applications: 61/670,354 filed on Jul. 11, 2012 and 61/711,453 filed on Oct. 9, 2012 with the United States Patent and Trademark Office.

TECHNICAL FIELD

The present invention relates to a system and method for processing MPEG data, and more particularly, to a technology of processing MPEG data by setting an enhanced media processing unit (MPU) and media fragment unit (MFU) from an access unit including media data coded through encapsulation processing.

BACKGROUND ART

A technology of processing MPEG data may refer to a technology of processing MPEG data using an MPEG media transport (MMT) system for providing a general conversion format and may process the MPEG data using a format of MMT asset.

DISCLOSURE OF INVENTION

Technical Goals

Embodiments of the present invention provide a method, apparatus, and system for processing MPEG data by setting an enhanced media processing unit (MPU) and media fragment unit (MFU) from an access unit including media data coded through encapsulation processing.

Embodiments of the present invention also provide a method, apparatus, and system for transmitting MPEG data by inserting a predetermined flag into a header of an MPU and an MFU during a process of processing MPEG data.

Embodiments of the present invention also provide a method, apparatus, and system for receiving MPEG data by extracting a predetermined flag included in a header of an MPU and an MFU during a process of processing MPEG data.

Technical Solutions

According to an aspect of the present invention, there is provided a method of processing MPEG data, the method including: obtaining at least one access unit including media data coded through processing including an encapsulation and a packetization; generating at least one media processing unit (MPU) by grouping the at least one access unit; determining a duration flag indicating whether duration information of the at least one access unit is valid, in the at least one MPU; and inserting the duration flag into a header of the at least one MPU.

The determining may include setting the duration flag to "1" when the duration information of the at least one access unit is valid.

The method of processing MPEG data may further include: determining a default duration flag indicating whether a default duration of the at least one access unit is valid, in the at least one MPU; and inserting the default duration flag into the header of the at least one MPU.

The determining of the default duration flag may include setting the default duration flag to "1" when the default duration of the at least one access unit is valid.

The method of processing MPEG data may further include: determining a default duration indicating a default presentation duration of the at least one access unit in the at least one MPU; and inserting the default duration into the header of the at least one MPU.

The method of processing MPEG data may further include: determining a duration indicating a presentation duration of the at least one access unit in the at least one MPU; and inserting the duration into the header of the at least one MPU.

According to another aspect of the present invention, there is provided a method of processing MPEG data, the method including: receiving at least one MPU; extracting a duration flag included in a header of the at least one MPU; determining whether duration information of the at least one access unit included in the at least one MPU is valid, based on the duration flag; and processing the at least one MPU, based on the determination result.

According to still another aspect of the present invention, there is provided a method of processing MPEG data, the method including: obtaining at least one access unit including media data coded through processing including an encapsulation and a packetization; generating at least one media fragment unit (MFU) by fragmenting the at least one access unit; determining a priority present flag indicating whether priority information of the at least one MFU is valid, in the at least one MFU; and inserting the priority present flag into a header of the at least one MFU.

The determining may include setting the priority present flag to "1" when the priority information of the at least one MFU is valid.

The method of processing MPEG data may further include: determining a start flag indicating a start MFU of the at least one access unit in the at least one MFU; and inserting the start flag into the header of the at least one MFU.

The determining of the start flag may include setting the start flag to "1" when the at least one MFU is the start MFU of the at least one access unit.

The method of processing MPEG data may further include: determining a sending order present flag indicating whether a sending order of the at least one MFU is valid, in the at least one MFU; and inserting the sending order present flag into the header of the at least one MFU.

The determining of the sending order present flag may include setting the sending order present flag to "1" when the sending order of the at least one MFU is valid.

The method of processing MPEG data may further include: determining a priority indicating a relative priority of the at least one MFU with respect to remaining MFUs excluding the at least one MFU, in the at least one MFU; and inserting the priority into the header of the at least one MFU.

The method of processing MPEG data may further include: determining a sending order designating a relative sending order of the at least one MFU with respect to remaining MFUs excluding the at least one MFU, in the at least one MFU; and inserting the sending order into the header of the at least one MFU.

According to yet another aspect of the present invention, there is provided a method of processing MPEG data, the method including: receiving at least one MFU; extracting a priority present flag included in a header of the at least one MFU; determining whether priority information of the at least one MFU included in the at least one MFU is valid, based on the priority present flag; and processing the at least one MFU based on the determination result.

Effects of Invention

According to embodiments of the present invention, there may be provided a method, apparatus, and system for processing MPEG data by setting an enhanced media processing unit (MPU) and media fragment unit (MFU) from an access unit including media data coded through encapsulation processing.

Also, according to embodiments of the present invention, there may be provided a method, apparatus, and system for transmitting MPEG data by inserting a predetermined flag into a header of an MPU and an MFU during a process of processing MPEG data.

Also, according to embodiments of the present invention, there may be provided a method, apparatus, and system for receiving MPEG data by extracting a predetermined flag included in a header of an MPU and an MFU during a process of processing MPEG data.

BRIEF DESCRIPTION OF DRAWINGS

FIG. 4 is a diagram illustrating syntax of an MPU according to an embodiment of the present invention.

FIG. 6 is a diagram illustrating syntax of an MFU according to an embodiment of the present invention.

BEST MODE FOR CARRYING OUT THE INVENTION

Figure 1A:
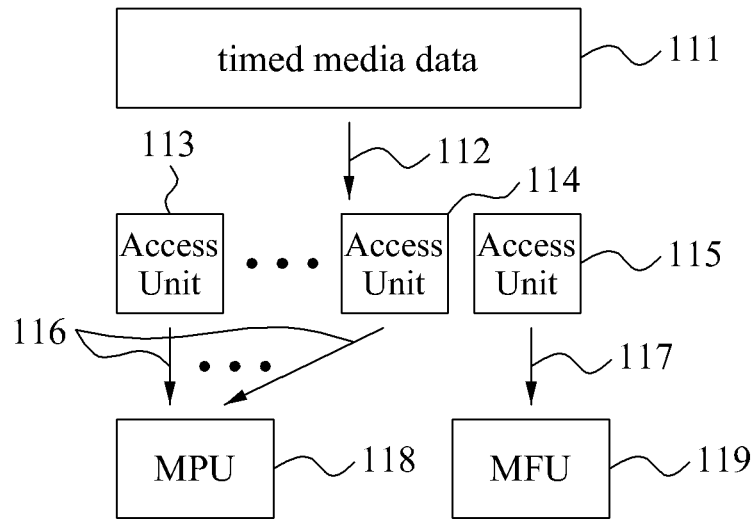
FIGS. 1A and 1B are diagrams illustrating a media processing unit (MPU) and a media fragment unit (MFU).

Hereinafter, embodiments of the present invention will be described with reference to the accompanying drawings. However, the present invention is not limited to the embodiments or restricted thereby. Also, like reference numerals used in each drawing refer to like constituent elements.

Figure 1B:
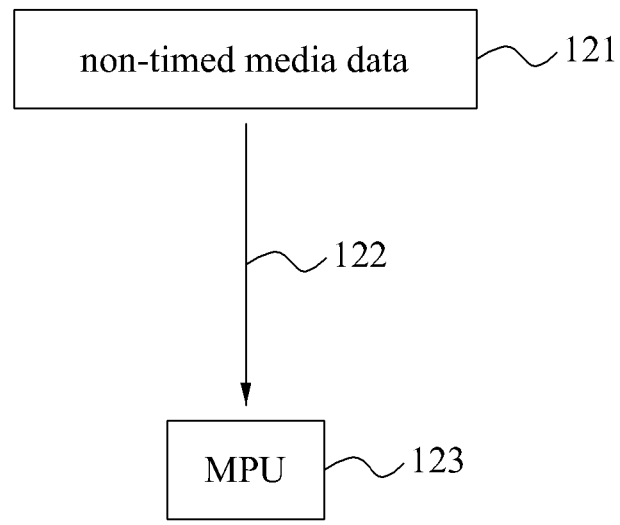

FIGS. 1A and 1B are diagrams illustrating a media processing unit (MPU) and a media fragment unit (MFU).

Referring to FIGS. 1A and 1B, timed media data 111 and non-timed media data 121 may be set using the MPU and the MFU that are formats of an MPEG media transport (MMT) asset and thereby be processed in operations 110 and 120.

Here, each of MPUs 118 and 123 may be construed from at least one access unit, at least one MFU 119, or the non-timed media data 121, and may be provided in an encapsulated and packetized data format.

Also, the MFU 119 may be generated by fragmenting an access unit or may be generated from a single access unit, and may be provided in an encapsulated and packetized data format.

More specifically, referring to operation 110 of processing the timed media data 111, the timed media data 111 may be converted to a plurality of access units 113, 114, and 115 coded through encapsulation processing in operation 112. Also, the plurality of access units 113, 114, and 115 may be converted to the MPU 118 and the MFU 119 that are formats of the MMT asset in operations 116 and 117. Here, the MPU 118 may be generated by grouping the plurality of access units 113 and 114 in operation 116. The MFU 119 may be generated from the single access unit 115 in operation 117. The MFU 119 may be generated by fragmenting the single access unit 115. A description related thereto will be made below.

Referring to operation 120 of processing the non-timed media data 121, the non-timed media data 121 may be converted to the MPU 123 in operation 122.

Figure 2:
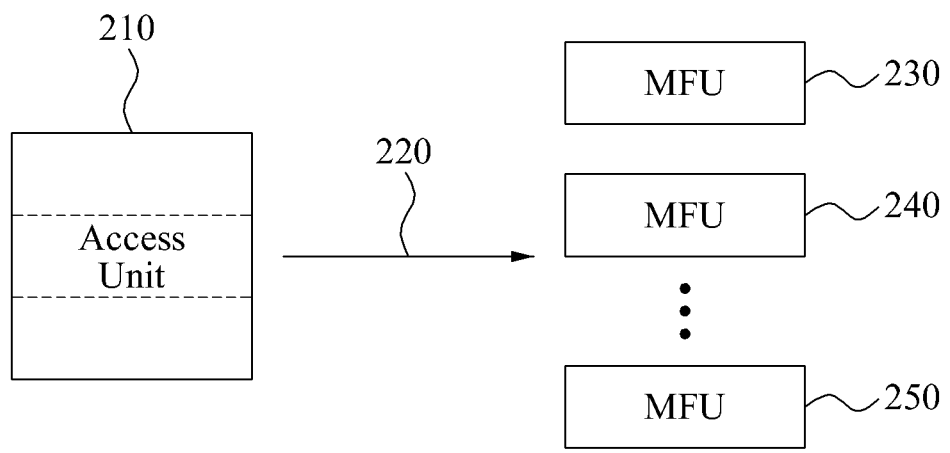
FIG. 2 is a diagram illustrating an MFU obtained by fragmenting an access unit.

FIG. 2 is a diagram illustrating an MFU obtained by fragmenting an access unit.

Referring to FIG. 2, a plurality of MFUs 230, 240, and 250 may be obtained by fragmenting a single access unit 210 in operation 220. Here, each of the plurality of MFUs 230, 240, and 250 may be independently used, may include an identifier to be distinguished from each other, and may include an identifier for generalizing relational information between the plurality of MFUs 230, 240, and 250 within a single access unit.

The aforementioned MPU and MFU may be defined by reference materials of "High efficiency coding and media delivery in heterogeneous environments" specified in International Organization for Standardization/International Electrotechnical Commission (ISO/IEC) Joint Technical Committee One (JTC1)/SC29/WG11 n12690.

Figure 3:
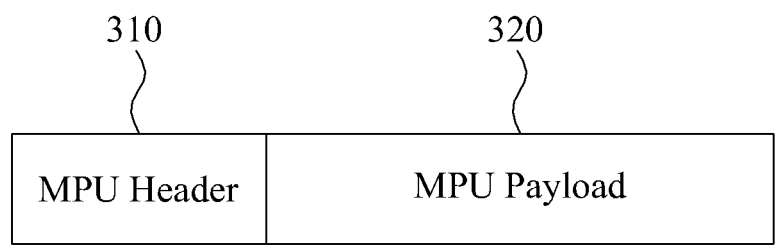
FIG. 3 is a diagram illustrating an MPU packet according to an embodiment of the present invention.

FIG. 3 is a diagram illustrating an MPU packet according to an embodiment of the present invention.

Referring to FIG. 3, the MPU packet includes an MPU header 310 and an MPU payload 320. Here, the MPU payload 320 may include MPEG data. The MPU header 310 may include an MPU length, an MPU header length, an MPU sequence number, an access unit number, a duration flag, a default duration flag, a default duration, a duration, a private header flag, a private header length, and a private header. A description related thereto will be made below.

FIG. 4 is a diagram illustrating syntax of an MPU according to an embodiment of the present invention.

Referring to FIG. 4, a header of the MPU may include an MPU length, an MPU header length, an MPU sequence number, an access unit number, a private header flag, a private header length, a private header, a duration flag 410, a default duration flag 420, a default duration 430, and a duration 440.

Here, the duration flag 410 may indicate whether duration information of an access unit is valid, in the MPU. The duration flag 410 may be set to a bit value of "1" when the duration information of the access unit is valid.

Also, the default duration flag 420 may indicate whether a default duration of the access unit is valid, in the MPU. The default duration flag 420 may be set to a bit value of "1" when the default duration of the access unit is valid.

Also, the default duration 430 may indicate a default presentation duration of the access unit in the MPU. Here, the default duration 430 may be set when the duration flag 410 is valid and the default duration flag 420 is valid.

Also, the duration 440 may indicate a presentation duration of the access unit in the MPU. The duration 440 may be set when the duration flag 410 is valid and the default duration flag 420 is invalid.

Figure 5:
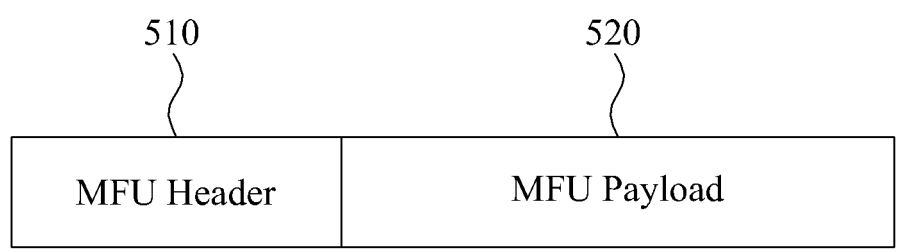
FIG. 5 is a diagram illustrating an MFU packet according to an embodiment of the present invention.

FIG. 5 is a diagram illustrating an MFU packet according to an embodiment of the present invention.

Referring to FIG. 5, the MFU packet includes an MFU header 510 and an MFU payload 520. Here, the MFU payload 520 may include MPEG data. The MFU header 510 may include an MFU length, an MFU header length, a start flag, a priority present flag, a sending order present flag, a priority, and a sending order. A description related thereto will be made below.

FIG. 6 is a diagram illustrating syntax of an MFU according to an embodiment of the present invention.

Referring to FIG. 6, a header of the MFU may include an MFU length, an MFU header length, a start flag 610, a priority present flag 620, a sending order present flag 630, a priority 640, and a sending order 660.

Here, the priority present flag 620 may indicate whether priority information of the MFU is valid, in the MFU. The priority present flag may be set to a bit value of "1" when the priority information of the MFU is valid, and may be considered with respect to MFUs of each of a plurality of access units as well as a single access unit.

Also, the start flag 610 may indicate a start MFU of an access unit in the MFU. The start flag 610 may be set to a bit value of "1" when a corresponding MFU is the start MFU of the access unit, and may indicate the start MFU of the corresponding access unit and may also indicate an end of a last MFU of a previous access unit.

Also, the sending order present flag 630 may indicate whether a sending order of the MFU is valid, in the MFU. Here, the sending order present flag 630 may be set to a bit value of "1" when the sending order of the MFU is valid.

A dependency counter 650 may be included in an existing MFU header. Here, the dependency counter 650 may indicate numbers of remaining MFUs depending on the corresponding MFU within the single access unit. However, use of the dependency counter 650 may cause mismatch between a signal value and the remaining MFUs, thereby causing a priority between the remaining MFUs and the corresponding MFU to be unclear. Accordingly, a method according to an exemplary embodiment proposes the priority 640 in lieu of the dependency counter 650.

The priority 640 may indicate a relative priority of the corresponding MFU with respect to the remaining MFUs excluding the corresponding MFU, in the MFU. The priority 640 may be set when the priority present flag 620 is valid.

The sending order 660 may designate a relative sending order of the corresponding MFU with respect to the remaining MFUs excluding the corresponding MFU, in the MFU. The sending order 660 may be set when the sending order present flag 630 is valid. Also, the sending order 660 may indicate a decoding order of each of a plurality of MFUs within a single access unit.

Figure 7:
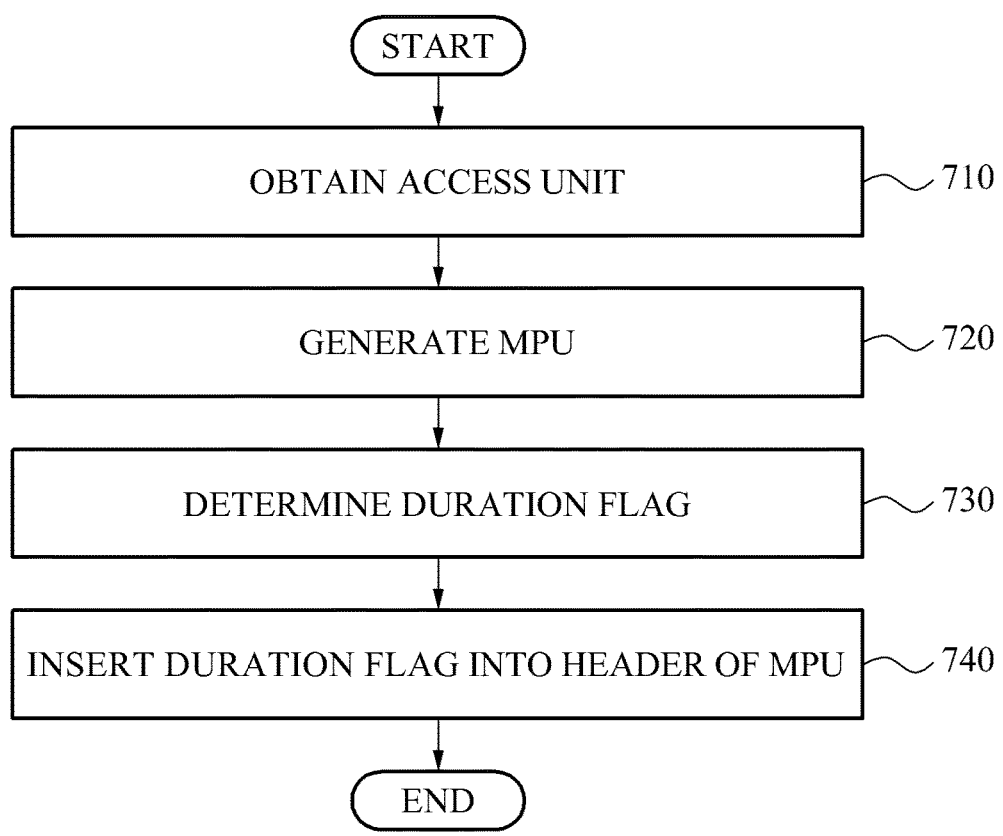
FIG. 7 is a flowchart illustrating a method of processing MPEG data by setting an MPU in a transmission apparatus according to an embodiment of the present invention.

FIG. 7 is a flowchart illustrating a method of processing MPEG data by setting an MPU in a transmission apparatus according to an embodiment of the present invention.

Referring to FIG. 7, the method according to an embodiment of the present invention may obtain at least one access unit including media data coded through processing including an encapsulation and a packetization in operation 710.

In operation 720, the method may generate at least one MPU by grouping the at least one access unit.

In operation 730, the method may determine a duration flag indicating whether duration information of the at least one access unit is valid, in the at least one MPU. Here, a process of determining the duration flag may include a process of setting the duration flag to "1" when the duration information of the at least one access unit is valid.

In operation 740, the method may insert the duration flag into a header of the at least one MPU.

Also, the method according to an embodiment of the present invention may determine a default duration flag indicating whether a default duration of the at least one access unit is valid, in the at least one MPU, and may insert the default duration flag into the header of the at least one MPU. Here, a process of determining the default duration flag may include a process of setting the default duration flag to "1" when the default duration of the at least one access unit is valid.

Also, the method according to an embodiment of the present invention may determine a default duration indicating a default presentation duration of the at least one access unit, and may insert the default duration into the header of the at least one MPU.

Also, the method may determine a duration indicating a presentation duration of the at least one access unit in the at least one access unit, and may insert the duration into the header of the at least one MPU.

Figure 8:
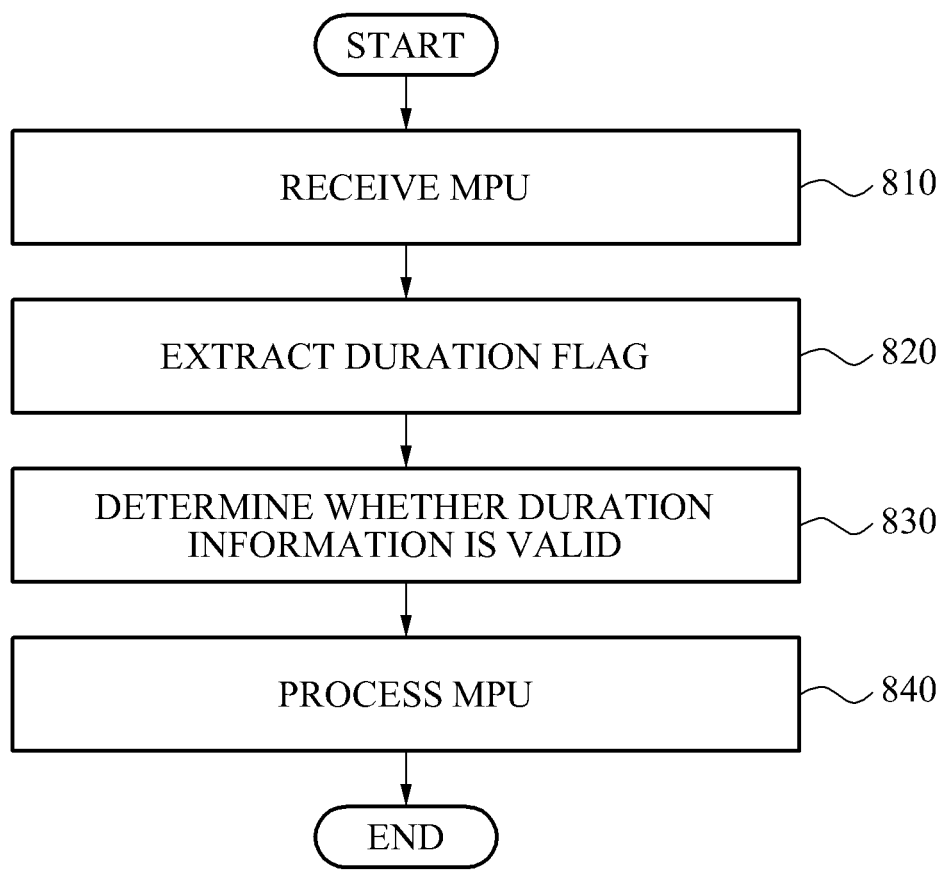
FIG. 8 is a flowchart illustrating a method of processing MPEG data set as an MPU in a reception apparatus according to an embodiment of the present invention.

FIG. 8 is a flowchart illustrating a method of processing MPEG data set as an MPU in a reception apparatus according to an embodiment of the present invention.

Referring to FIG. 8, the method according to an embodiment of the present invention may receive at least one MPU in operation 810.

In operation 820, the method may extract a duration flag included in a header of the at least one MPU.

In operation 830, the method may determine whether duration information of the at least one access unit is valid, based on the duration flag.

In operation 840, the method may process the at least one MPU, based on the determination result.

Figure 9:
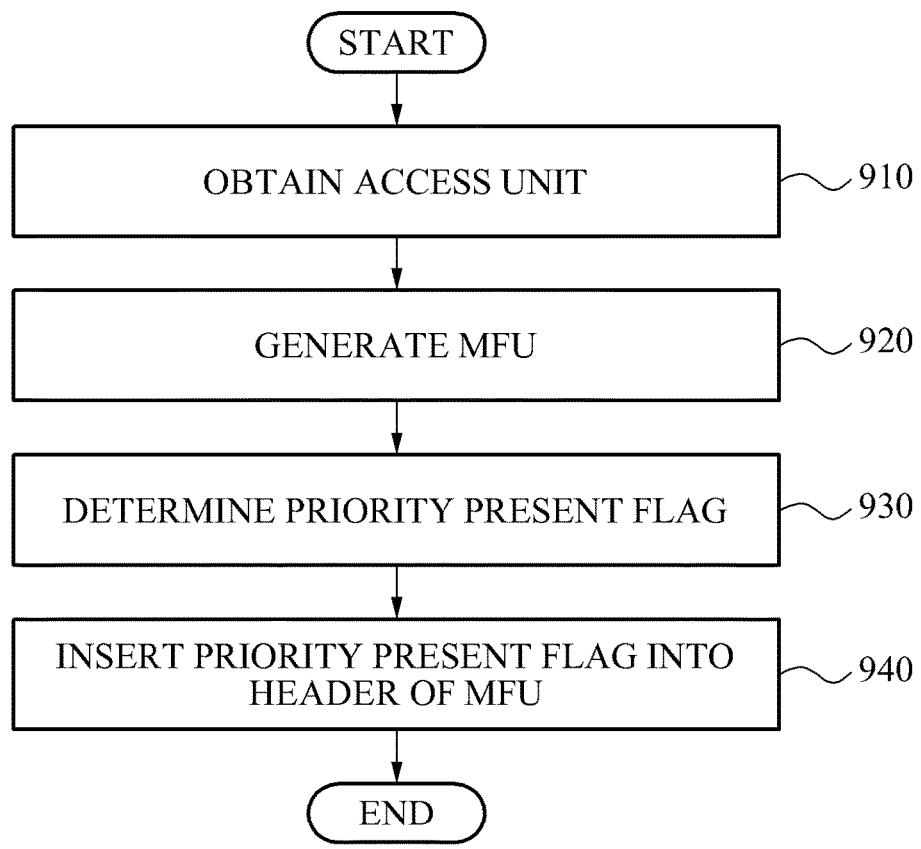
FIG. 9 is a flowchart illustrating a method of processing MPEG data by setting an MFU in a transmission apparatus according to an embodiment of the present invention.

FIG. 9 is a flowchart illustrating a method of processing MPEG data by setting an MFU in a transmission apparatus according to an embodiment of the present invention.

Referring to FIG. 9, the method according to an embodiment of the present invention may obtain at least one access unit including media data coded through processing including an encapsulation and a packetization in operation 910.

In operation 920, the method may generate at least one MFU by fragmenting the at least one access unit.

In operation 930, the method may determine a priority present flag indicating whether priority information of the at least one MFU is valid, in the at least one MFU. Here, a process of determining the priority present flag may include a process of setting the priority present flat to "1" when the priority information of the at least one MFU is valid.

In operation 940, the method may insert the priority present flag into a header of the at least one MFU.

Also, the method according to an embodiment of the present invention may determine a start flag indicating a start MFU of the at least one MFU, and may insert the start flag into the header of the at least one MFU. Here, a process of determining the start flag may include a process of setting the start flag to "1" when the at least one MFU is the start MFU of the at least one MFU.

Also, the method according to an embodiment of the present invention may determine a sending order present flag indicating whether a sending order of the at least one MFU is valid, in the at least one MFU, and may insert the sending order present flag into the header of the at least one MFU. Here, a process of determining the sending order present flag may include a process of setting the sending order present flag to "1" when the sending order of the at least one MFU is valid.

Also, the method according to an embodiment of the present invention may determine a priority indicating a relative priority of the at least one MFU with respect to the remaining MFUs excluding the at least one MFU, in the at least one MFU, and may insert the priority into the header of the at least one MFU.

Also, the method according to an embodiment of the present invention may determine a sending order designating a relative sending order of the at least one MFU with respect to the remaining MFUs excluding the at least one MFU, in the at least one MFU, and may insert the sending order into the header of the at least one MFU.

Figure 10:
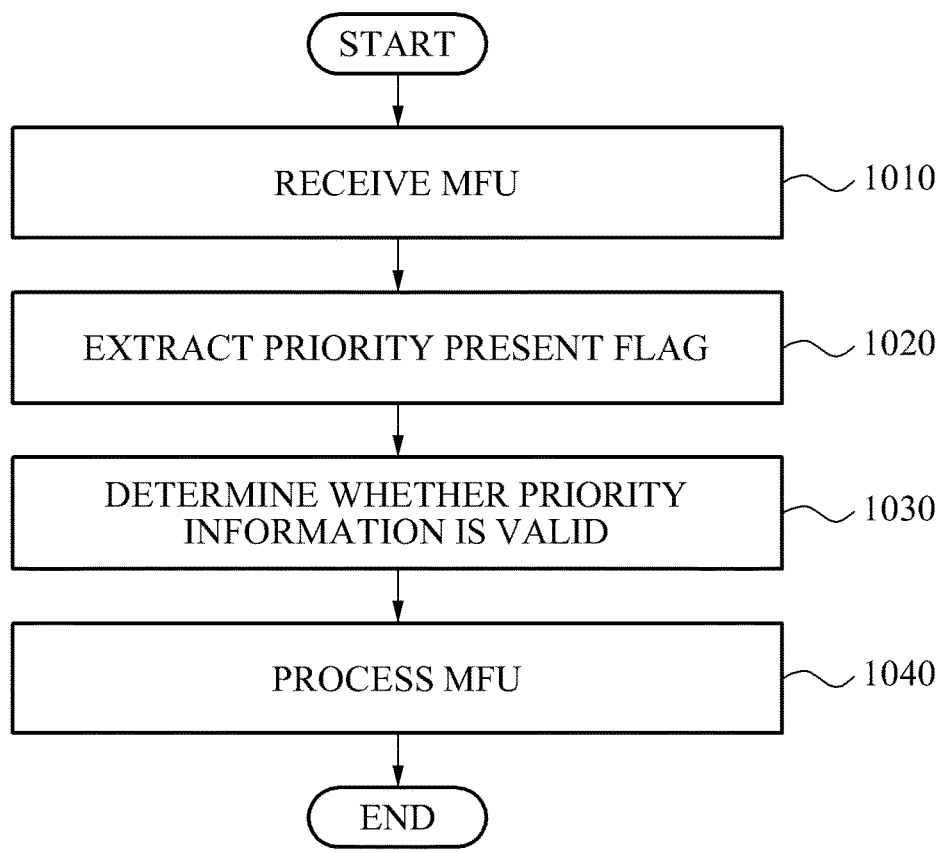
FIG. 10 is a flowchart illustrating a method of processing MPEG data set as an MFU in a reception apparatus according to an embodiment of the present invention.

FIG. 10 is a flowchart illustrating a method of processing MPEG data set as an MFU in a reception apparatus according to an embodiment of the present invention.

Referring to FIG. 10, the method according to an embodiment of the present invention may receive at least one MFU in operation 1010.

In operation 1020, the method may extract a priority present flag included in a header of the at least one MFU.

In operation 1030, the method may determine whether priority information of the at least one MFU included in the at least one MFU is valid, based on the priority present flag.

In operation 1040, the method may process the at least one MFU based on the determination result.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of processing MPEG data performed by one or more processor, the method comprising:
    identifying timed media data and non-time media data;
    generating at least one media processing unit (MPU) related to media transport asset based on the timed media data and non-time media data using;
    providing the MPU as encapsulated and packetized data format,
    wherein the each MPU includes a plurality of Access Unit(AU) derived from the timed media data or non-timed media data.

2. The method of claim 1, further comprising:
    determining a duration flag indicating whether duration information of the at least one access unit is valid, in the at least one MPU; and
    inserting the duration flag into a header of the at least one MPU,
    wherein the determining comprises setting the duration flag to "1" when the duration information of the at least one access unit is valid.

3. The method of claim 1, further comprising:
    determining a default duration flag indicating whether a default duration of the at least one access unit is valid, in the at least one MPU; and
    inserting the default duration flag into the header of the at least one MPU.

4. The method of claim 3, wherein the determining of the default duration flag comprises setting the default duration flag to "1" when the default duration of the at least one access unit is valid.

5. The method of claim 1, further comprising:
    determining a default duration indicating a default presentation duration of the at least one access unit in the at least one MPU; and inserting the default duration into the header of the at least one MPU.

6. The method of claim 1, further comprising:

determining a duration indicating a presentation duration of the at least one access unit in the at least one MPU; and inserting the duration into the header of the at least one MPU.

7. An apparatus for processing MPEG data, the apparatus comprising:

one or more processors configured to:

identify timed media data and non-time media data;

generate at least one media processing unit (MPU) related to media transport asset based on the timed media data and non-time media data using;

provide the MPU as encapsulated and packetized data format, wherein the each MPU includes a plurality of Access Unit(AU) derived from the timed media data or non-timed media data.

\* \* \* \* \*